Dec. 6, 1932.          S. DAVID          1,889,954
SECURING DEVICE FOR CLOTHING
Filed Jan. 23, 1932
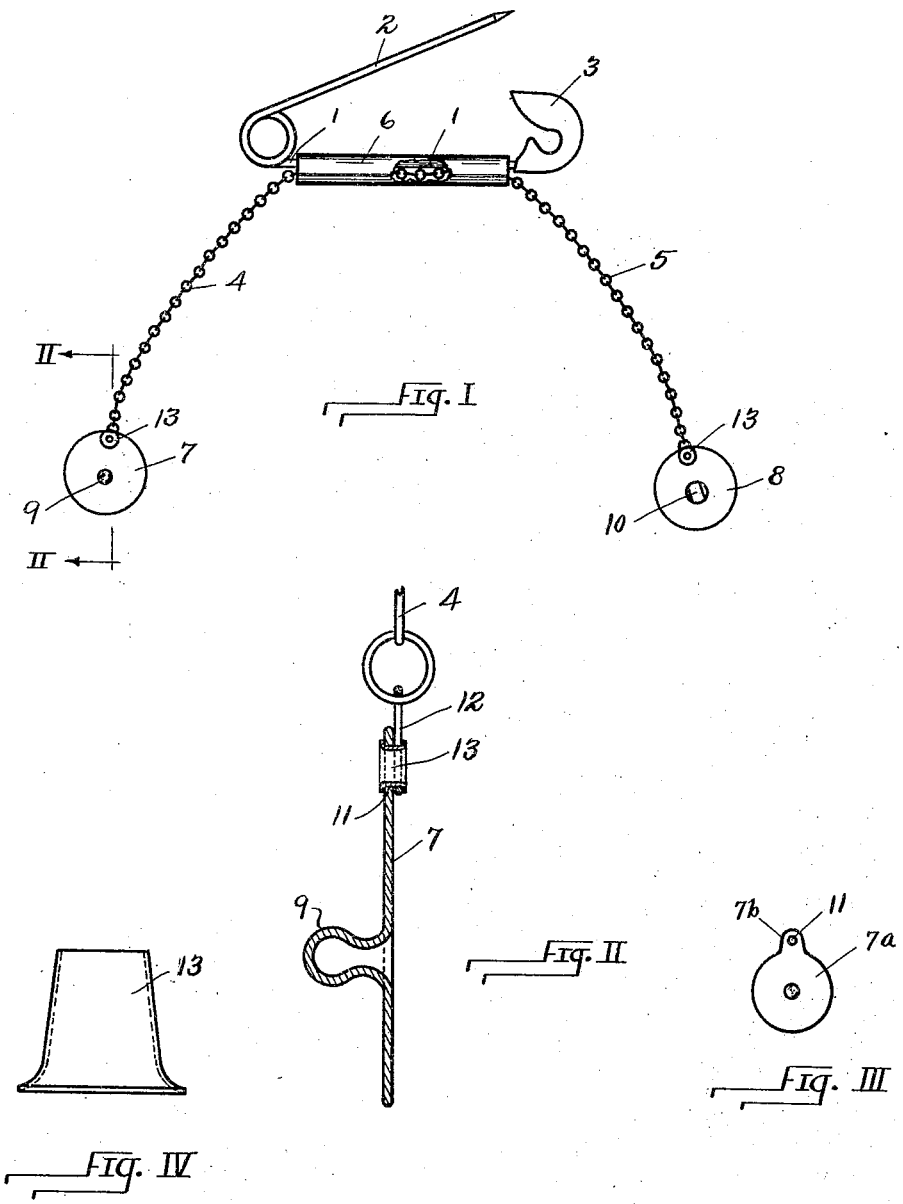
INVENTOR
Sara David
by Christy Christy and Wharton
her attorneys Patented Dec. 6, 1932

1,889,954

UNITED STATES PATENT OFFICE

SARA DAVID, OF PITTSBURGH, PENNSYLVANIA

SECURING DEVICE FOR CLOTHING

Application filed January 23, 1932. Serial No. 588,265.

My invention relates to a fastening device for clothing, and finds particular utility in securing the shoulder straps of undergarments to a dress or outer garment.

Essentially the device comprises a safety-pin from adjacent each end of which there extends a length of light weight chain. To the otherwise free ends of the chain there are secured fastening elements, such in character that the two fastening elements may be united at will and the two lengths of chain formed into a loop. A structure of this general character is described in Letters Patent of the United States No. 1,826,167, granted to me October 6, 1931. In the structure of the patent a length of light weight chain, extends from each of the opposite ends of the safety-pin. Each length of chain is secured at one end to the safety-pin, by means of an open link (a so-called jumper ring), the ends of which open link are "pinched" into a position of mutual abutment, when the link has been fitted over the parts to be mutually secured. The same jumper ring attachment is employed for securing the otherwise free ends of the chain to the fastening elements.

I have discovered certain structural refinements, applicable to devices of this general class, to provide a more durable fastening device, and a fastening device which greatly reduces or practically eliminates manual operation in its manufacture.

In Fig. I of the accompanying drawing an embodiment of the invention is shown in side elevation; Fig. II shows, to larger scale, and in medial cross-section on the plane II—II of Fig. I, a fastening element secured to one free end of the chain; Fig. III is a view in plan of a fastening element of modified structure; and Fig. IV is a view in side elevation, and to large scale, of a device employed in securing the fastening elements to the chain.

The safety-pin is the safety-pin of familiar construction, and includes a bar 1, at the one end of which the pointed shank 2 is pivoted. This pivoting is ordinarily effected by making the bar and shank of one length of wire, coiled to a spiral midway its length. The opposite end of the bar is formed or provided with a keeper 3, within which the pointed end of shank 2 may be brought and retained by the tension of the spiral coil alluded to. The bar 1 and the shank 2 swing angularly in their common plane.

From adjacent each of the opposite ends of the pin extends a chain of links of small diameter and light weight. The two lengths 4 and 5 of the chain are substantially of equal length, and are provided at their otherwise free ends with means for their mutual attachment, to form a loop.

Advantageously, the two effective chain lengths, 4 and 5, may constitute portions of a single length of chain, which is secured intermediate its ends to the bar 1 of the safety-pin. A metal band may be compressed or otherwise secured around the chain and the bar 1, to effect the attachment; indeed, I press an elongate, slit sleeve 6 about the parts, as indicated in Fig. I. In addition to affording the desired union of the chain and pin, the sleeve 6 serves as a spacer which determines the points at which the chain elements 4 and 5 depend from the safety-pin. In effect the chain elements 4 and 5 are secured to the opposite ends of the safety-pin, this being a desirable characteristic of the device. A thing of great practical importance in my present structure is that the chain and safety-pin may be united in an automatic machine, the band or sleeve 6 admitting of mechanical assembling, which, of course, is accompanied by economy in the production of the article.

A snap-fastener composed of two complementary elements 7 and 8 of relatively large diameter and great weight, as compared with the links of the chain, is secured one element to each of the otherwise free ends of the chain. The snap-fastener is a thing of known construction, the part 7 including a ball member 9 projecting from its face, and the part 8 including a socket 10 formed in its body to receive the ball 9, whereby the parts 7 and 8 may be yieldingly united, to form a closed loop in the chain.

The attachment of the chain to the snap-fastener elements (7, 8) has hitherto been by means of jumper rings, alluded to above, and such rings of necessity require hand operation to effect their installation. The structure I now propose is of advantage in that it may be assembled mechanically, and creates a stronger and more durable union between the chain and snap-fastener elements. The snap-fastener elements are each provided with an orifice 11 (Fig. II), and the end link 12 of the chain is positioned in registry therewith. An expansible metal eyelet 13 is placed within the orifice 11 and link 12, and expanded to the position illustrated in Fig. II, whereupon the parts are securely united. The metal eyelet 13, as shown in side elevation in Fig. IV, is a thing of known structure, but the particular combination in which I employ it is new.

As mentioned above, this manner of securing the snap-fastener elements to the chain may be accomplished mechanically. It appears, however, that difficulty may be encountered in such mechanical assembling of the parts, due to the fact that the ball element 9 and the socket 10 of the snap-fastener elements interfere with the dies of the assembling machine. To overcome this difficulty, I contemplate offsetting the ball 9 and socket 10 from the immediate centers of the bodies 7 and 8 in which they are formed. That is to say, the ball 9 and socket 10 are each correspondingly located off center in the respective disks 7, 8. Thus the service of the fastener is unimpaired, while the clearance, which may be essential, is afforded.

Fig. III illustrates a modification in the form of the fastener elements, to provide the clearance in question. The body 7a of each fastener element may be provided with a tongue 7b, and the orifice 11 for the reception of the expanded metal eyelet 13 is provided in the tongue.

The device primarily is intended for securing in place beneath an outer garment the shoulder straps of an undergarment of women's wear. In use the safety-pin may be pinned to the outer garment, and this will ordinarily be done through the shoulder seam from the inside, so that the body of the safety-pin remains invisible on the outside of the garment. The chain is then looped about the shoulder strap of the undergarment and the free ends of the chain are secured together. When the shoulder strap of the undergarment has so been looped within the loop-forming members of the device, it is held against slipping down in an objectionable way. It is not necessary to unpin the device in undressing; it is sufficient merely to open the snap-fastener. If the outer garment is a washable garment, the whole device may be removed by unpinning it before the article goes to the wash. I do not limit myself to particular dimensions, but in an embodiment of the invention which I have employed with success, the safety-pin is three-fourths of an inch long, and the effective length of chain is approximately three inches.

I claim as my invention:

1. A securing device for clothing including a bar safety-pin, a chain of links of light weight, a band encircling the bar of the safety pin and said chain, whereby the chain extends in two substantially equal lengths from said bar, and a snap-fastener composed of two complementary parts secured one part to each of the lengths of chain at the otherwise free ends thereof.

2. A securing device for clothing including a bar safety-pin, a length of chain of links of light weight, a band compressed about the bar of said safety-pin and said chain intermediate its ends, and a snap-fastener composed of two complementary parts secured one part to each of the otherwise free ends of said chain.

3. A securing device for clothing including a bar safety-pin, a length of chain of links of light weight, an elongate split sleeve closed over the bar of said safety-pin and said chain intermediate its ends, and a fastener composed of two complementary elements secured one element to each of the otherwise free ends of said chain.

4. A securing device for clothing including a bar safety-pin, a length of chain of links of light weight, an elongate split sleeve closed over the bar of said safety-pin and said chain intermediate its ends, and a fastener composed of two complementary elements secured one element to each of the otherwise free ends of said chain, the means for securing the fastener elements to said chain comprising an expanded metal eyelet extending through an end link of said chain and an element of said fastener.

In testimony whereof I have hereunto set my hand.

SARA DAVID.